US012719840B2

(12) United States Patent
Novo Diaz et al.

(10) Patent No.: US 12,719,840 B2
(45) Date of Patent: Aug. 25, 2026

(54) REMOTE EXECUTION OF COMPUTER INSTRUCTIONS IN A KERNEL SPACE OF A COMMUNICATION DEVICE

(71) Applicant: Telefonaktiebolaget LM Ericsson (publ), Stockholm (SE)

(72) Inventors: Oscar Novo Diaz, Helsinki (FI); Aitor Hernandez Herranz, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 84 days.

(21) Appl. No.: 18/729,549

(22) PCT Filed: Jan. 24, 2022

(86) PCT No.: PCT/EP2022/051481

§ 371 (c)(1),
(2) Date: Jul. 17, 2024

(87) PCT Pub. No.: WO2023/138790

PCT Pub. Date: Jul. 27, 2023

(65) Prior Publication Data

US 2025/0168151 A1 May 22, 2025

(51) Int. Cl.
*H04L 9/40* (2022.01)

(52) U.S. Cl.
CPC ................................ *H04L 63/0428* (2013.01)

(58) Field of Classification Search
CPC ... H04L 63/0428; H04L 63/123; G06F 21/57; G06F 21/121
See application file for complete search history.

(56) References Cited

U.S. PATENT DOCUMENTS

| | | | | |
|---|---|---|---|---|
| 11,295,029 | B1 * | 4/2022 | Greenblatt | H04N 1/32144 |
| 12,335,286 | B1 * | 6/2025 | Erlingsson | G06F 9/545 |
| 2018/0039795 | A1 | 2/2018 | Gulati | |
| 2018/0060571 | A1 * | 3/2018 | Vandergeest | G06F 21/55 |
| 2019/0163910 | A1 | 5/2019 | Moon et al. | |
| 2020/0193017 | A1 | 6/2020 | Bannister et al. | |

FOREIGN PATENT DOCUMENTS

| | | | |
|---|---|---|---|
| KR | 101038048 B1 * | 6/2011 | G06F 21/56 |
| WO | 2018027018 A1 | 2/2018 | |

* cited by examiner

*Primary Examiner* — Michael R Vaughan
(74) *Attorney, Agent, or Firm* — Sonoda & Kobayashi Intellectual Property Law; Sarvajit S. Patil

(57) ABSTRACT

There is provided mechanisms for remote execution of computer instructions in a kernel space of a communication device. A method is performed by an application server for the communication device. The method comprises obtaining computer instructions for handling interaction between the application server and the kernel space. The computer instructions are to be remotely executed in the kernel space of the communication device. The method comprises sending an encrypted package comprises the computer instructions towards the kernel space of the communication device.

18 Claims, 7 Drawing Sheets

REMOTE EXECUTION OF COMPUTER INSTRUCTIONS IN A KERNEL SPACE OF A COMMUNICATION DEVICE

TECHNICAL FIELD

Embodiments presented herein relate to a method, an application server, a computer program, and a computer program product for remote execution of computer instructions in a kernel space of a communication device. Embodiments presented herein further relate to a method, a communication device, a computer program, and a computer program product for execution of computer instructions in the kernel space of the communication device.

BACKGROUND

In communication systems, there may be a challenge to obtain good performance and efficient communication between devices in the communication system.

For example, some communication devices that are managed by a service provider might be deployed at the premises of a customer. For example, a service provider might provide equipment in terms of communication devices to their customers in exchange of a monthly fee. A service provide might also provide the option of the customer buying communication devices from the service provider whilst only allowing the customer to have a restrictive, or otherwise limited, access to the communication devices. The communication devices might be regarded as, or be part of, customer-premises equipment or customer-provided equipment (CPE). Non-limiting examples of such communication devices are IoT device, with applications in consumer, commercial, industrial, and infrastructure spaces.

This enables customers to utilize the communication devices for different purposes within diverse technical applications within areas such as manufacturing, healthcare, transportation, and retail, to mention just a few.

On the other hand, the service provider still needs full, or at least partial, control of the communication devices, for example to verify that the customer is using the communication device in accordance with an agreement between the service provider and the customer, that the customer has not manipulated the communication device in an unallowed manner, and/or that the correct version, or release, of software is running on the communication device. For some of the control, the service provider might need to have access to the hardware of the communication device.

One way to accomplish this is to allow a representative, such as an engineer or a technician, of the service provider to visually inspect and gain operative control to the communication device whilst deployed at the customer. However, customers might require having full access to the communication devices for privacy and security reasons. For instance, when the communication devices are deployed in a factory, the customer might still need to have a full access of the communication devices in order to not interrupt other operations of the factory.

It would therefore be beneficial to enable the service provider to access the communication devices in a non-intrusive way.

SUMMARY

An object of embodiments herein is to address the above issues, by enabling service providers to remotely access the communication devices.

In general terms, the embodiments disclosed herein provides a mixed approach where the communication devices are controlled and owned by the customers whilst the service providers are enabled to implement and execute control of the communication devices.

According to a first aspect, a method for remote execution of computer instructions in a kernel space of a communication device is provided. The method is performed by an application server for the communication device. The method comprises obtaining computer instructions for handling interaction between the application server and the kernel space. The computer instructions are to be remotely executed in the kernel space of the communication device. The method comprises sending an encrypted package comprises the computer instructions towards the kernel space of the communication device.

According to a second aspect, an application server for remote execution of computer instructions in a kernel space of a communication device is provided. The application server comprises processing circuitry. The processing circuitry is configured to cause the application server to obtain computer instructions for handling interaction between the application server and the kernel space. The computer instructions are to be remotely executed in the kernel space of the communication device. The processing circuitry is configured to cause the application server to send an encrypted package comprises the computer instructions towards the kernel space of the communication device.

According to a third aspect, an application server for remote execution of computer instructions in a kernel space of a communication device is provided. The application server comprises an obtain module configured to obtain computer instructions for handling interaction between the application server and the kernel space. The computer instructions are to be remotely executed in the kernel space of the communication device. The application server comprises a send module configured to send an encrypted package comprises the computer instructions towards the kernel space of the communication device.

According to a fourth aspect, a computer program for remote execution of computer instructions in a kernel space of a communication device is provided. The computer program comprises computer program code which, when run on processing circuitry of an application server, causes the application server to perform a method according to the first aspect.

According to a fifth aspect, a method for execution of computer instructions in a kernel space of a communication device is provided. The method is performed by the communication device. The method comprises receiving, from an application server for the communication device, an encrypted package comprises computer instructions for handling interaction between the application server and the kernel space. The method comprises, in the kernel space, decrypting the encrypted package, resulting in a decrypted package. The method comprises, in the kernel space, executing the computer instructions in the decrypted package.

According to a sixth aspect, a communication device for execution of computer instructions in a kernel space of the communication device is provided. The communication device comprises processing circuitry. The processing circuitry is configured to cause the communication device to receive, from an application server for the communication device, an encrypted package comprises computer instructions for handling interaction between the application server and the kernel space. The processing circuitry is configured to cause the communication device to, in the kernel space, decrypt the encrypted package, resulting in a decrypted package. The processing circuitry is configured to cause the communication device to, in the kernel space, execute the computer instructions in the decrypted package.

According to a seventh aspect, a communication device for execution of computer instructions in a kernel space of the communication device is provided. The communication device comprises a receive module configured to receive, from an application server for the communication device, an encrypted package comprises computer instructions for handling interaction between the application server and the kernel space. The communication device comprises a decrypt module configured to, in the kernel space, decrypt the encrypted package, resulting in a decrypted package. The communication device comprises an execute module configured to, in the kernel space, execute the computer instructions in the decrypted package.

According to an eighth aspect, a computer program for execution of computer instructions in a kernel space of a communication device is provided. The computer program comprising computer program code which, when run on processing circuitry of the communication device, causes the communication device to perform a method according to the fifth aspect.

According to a ninth aspect, a computer program product comprising a computer program according to at least one of the fourth aspect and the eighth aspect and a computer readable storage medium on which the computer program is stored is provided. The computer readable storage medium could be a non-transitory computer readable storage medium.

Advantageously, these aspects enable an application server of the service provider to access the communication device in a non-intrusive way. That is, access can be provided to the service provider without any operations of the communication device, as performed by the customer, needed to be interrupted and without any representative of the service provided physically having to visit the customer premises where the communication devices is deployed.

Advantageously, these aspects enable computer instructions as provided by the application server to be remotely executed in the kernel space of a communication device. The computer instructions are thus regarded as remotely executed since they are provided by the application server but executed in the communication device, which is physically and logically separated from the application server. In turn, this enables efficient monitoring of the communication device since it avoids the risk of the computer instructions being manipulated in the user space of the communication device. This also enforces privacy of any data shared between the application server and the kernel space of the communication device.

Advantageously, these aspects can be used for different types of monitoring of the communication device, as well as for updating and/or changing applications run in the kernel space of the communication device. In turn, this potentially could limit the usage, or accessibility, of some parts of the communication device directly from the user space. Since the user of the communication device does not have access to the kernel space, these aspects can be used to prevent a user of the communication device to perform modifications to the communication device, where the modifications pertain to parameters controlled in the kernel space.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to mechanisms for remote execution of computer instructions in a kernel space of a communication device. In order to obtain such mechanisms, there is provided an application server, a method performed by the application server, a computer program product comprising code, for example in the form of a computer program, that when run on processing circuitry of the application server, causes the application server to perform the method. In order to obtain such mechanisms, there is further provided a communication device, a method performed by the communication device, and a computer program product comprising code, for example in the form of a computer program, that when run on processing circuitry of the communication device, causes the communication device to perform the method.

Figure 1:
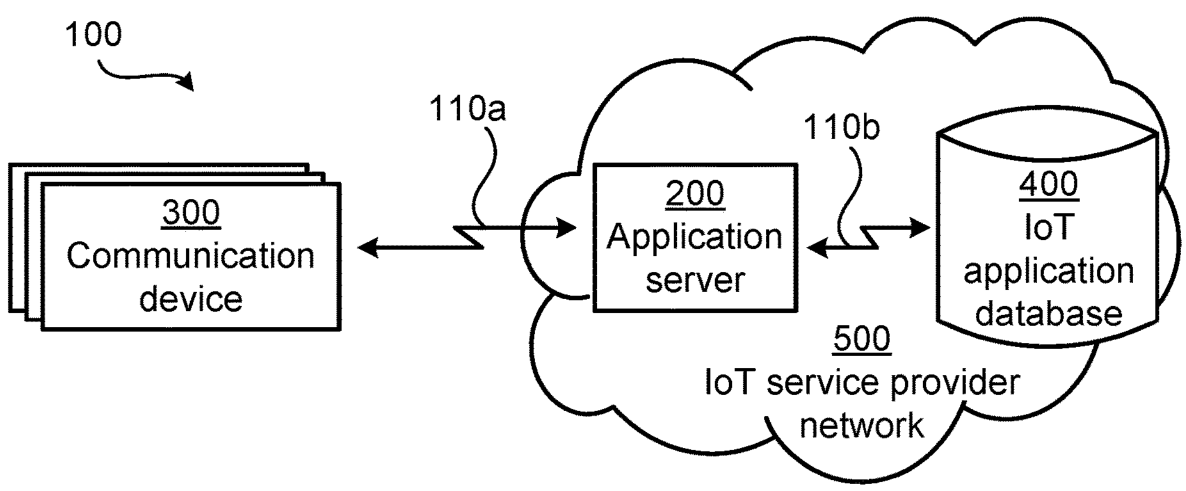
FIG. 1 is a schematic diagram illustrating a communication system according to embodiments.

Reference is made to FIG. 1 which schematically illustrates a communication system 100. An application server 200 and an IoT application database 400 are provided in an IoT service provider network 500. The IoT service provider network 500 handles, manages, or at least supports, applications run in communication devices 300. The IoT application database 400 might generate, store, and provide, computer instructions for the communication devices 300 to run the applications. The IoT application database 400 might further generate, store, encrypt, and provide, computer instructions for the IoT service provider network 500 to be able to interact with the communication devices 300 in a non-intrusive way. Alternatively, the encryption of the computer instructions is performed by the application server 200. As will be disclosed in further detail below, the computer instructions are provided to the communication devices 300 via the application server 200. The application server 200, the communication devices 300, and the IoT application database 400 communicate with each other according to communication links 110*a*, 110*b*.

As illustrated in the figure, the application server 200 is configured to act as an interface between the communication devices 300 and an IoT service provider, as represented by the IoT application database 400 and the IoT service provider network 500. The application server 200 might thus be regarded as a bridge between the communication devices 300 and an IoT service provider. For example, the application server 200 might implement functionality of an LwM2M server from the OMA LwM2M standard if the communication devices 300 integrate an LwM2M client.

The IoT service provider network 500 represents the operator network (or enterprise) that is responsible for managing the communication devices 300. The IoT service provider network 500, via the application server 200, sends computer instructions to the communication devices 300. By means of the application server 200, the IoT service provider network 500 also collects information from the communication devices 300.

Each of the communication devices 300 might be an IoT device. The computer instructions received by the communication devices 300 are to be executed in the kernel space of the communication devices 300. In some non-limiting examples, the computer instructions are provided in extended Berkeley Packet Filter (eBPF) packages.

Figure 2:
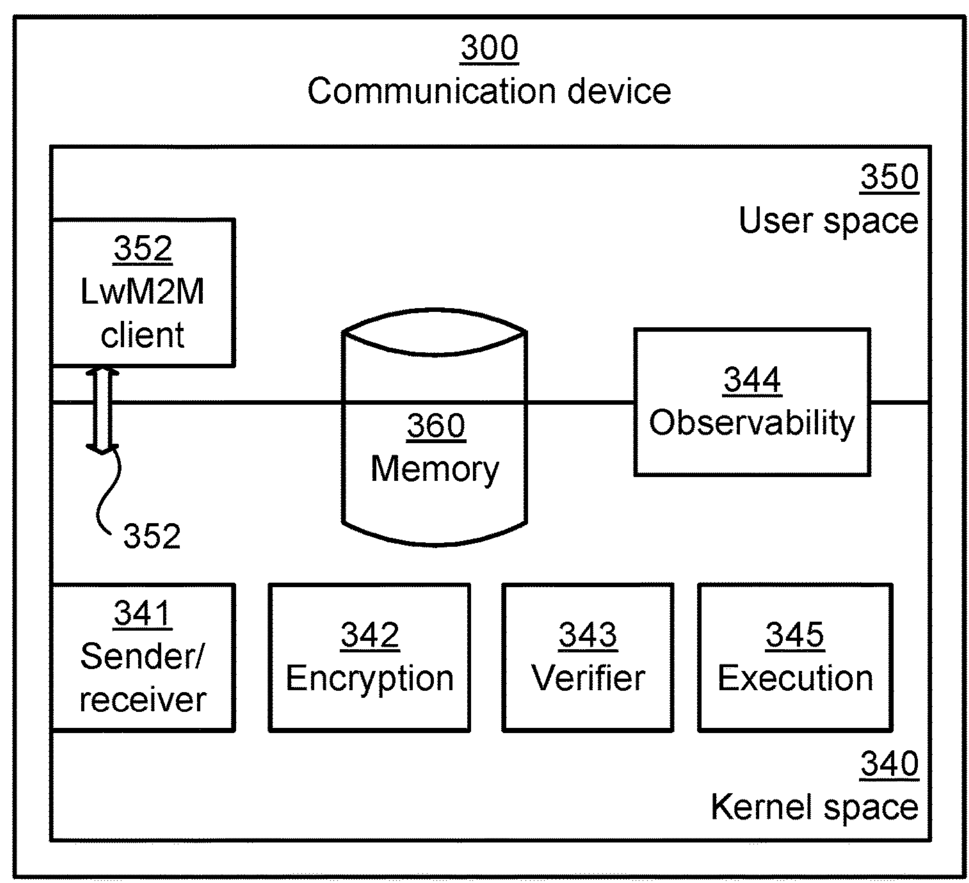
FIGS. 2 and 3 are block diagrams of a communication device according to embodiments.

Reference is next made to FIG. 2 which schematically illustrates division of the communication device 300 between a user space 350 and a kernel space 340. An internal memory 360 is split between the user space 350 and the kernel space 340. However, the user space 350 does not have access to the part of the internal memory 360 that is accessible by the kernel space 340. An LwM2M client module 352 is provided in the user space 350 for communication between the user space 350 and external entities, such as the application server 200. The LwM2M client module 352 further enables communication between the kernel space 340 and external entities, such as the application server 200, via the user space 350, as indicated by arrow 254. A sender/receiver module 341 is provided in the kernel space 340. This sender/receiver module 341 enables direct communication between the kernel space 340 and external entities, such as the application server 200, without passing through the user space 350. An encryption module 342 is configured to decrypt packages received from the sender/receiver module 341 and to encrypt passages sent to the sender/receiver module 341. A verifier module 343 is configured to verify packages received from the sender/receiver module 341 and to provide means (for example of a digital signature) that enable a package to be verified or authenticated. An observability module 344 interfaces the user space 350 and the kernel space 340 and is configured to allow observability of information passed through the sender/receiver module 341 (i.e., information received by, and sent by, the kernel space 340). An execution module 345 is configured for execution of computer instructions in the kernel space 340. One or more of the disclosed modules might be enabled and disabled as needed.

Figure 3:
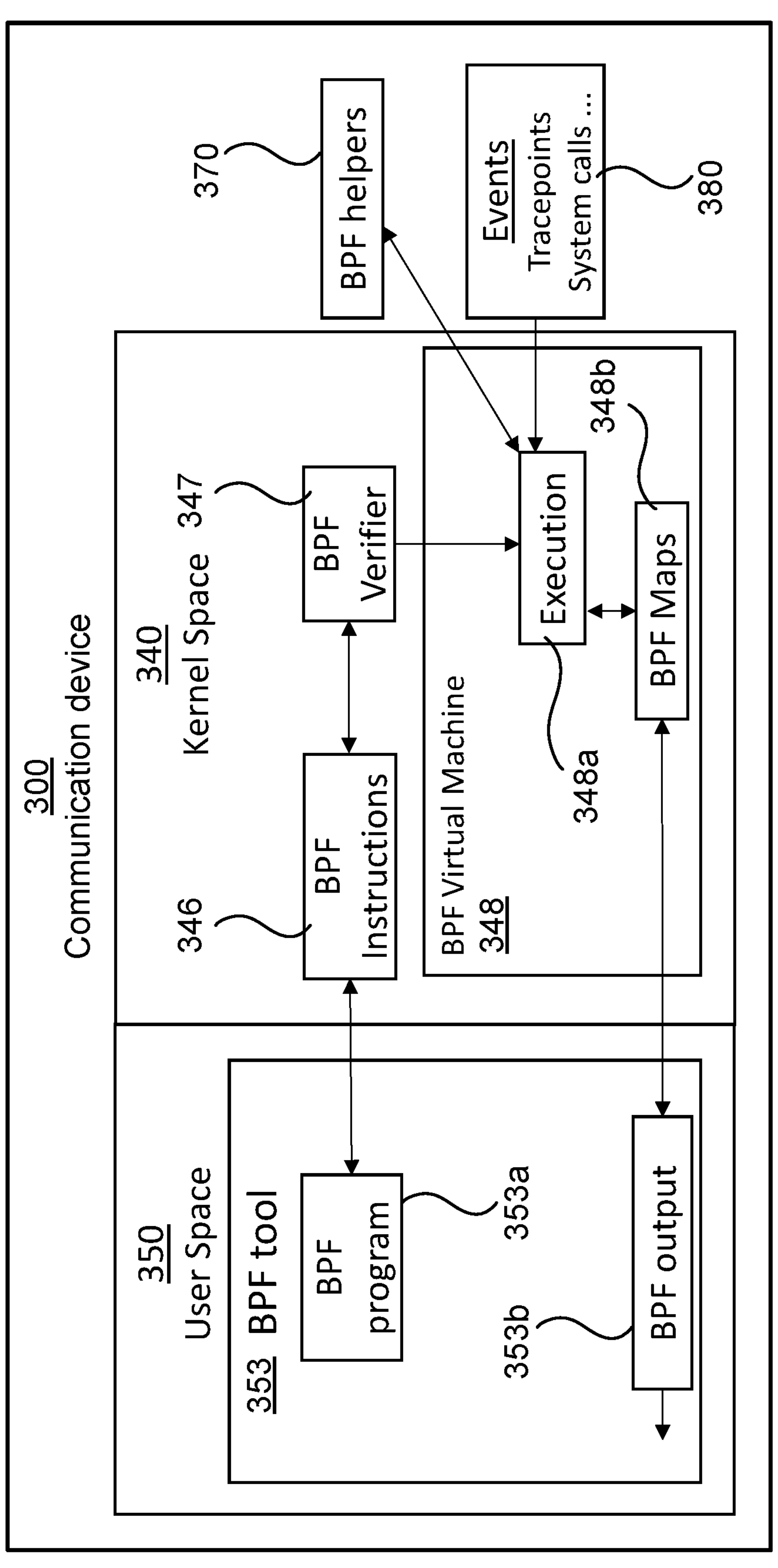

Reference is next made to FIG. 3 which in terms of a block diagram schematically illustrates operations of, and interaction between, the user space 350 and the kernel space 340 of the communication device 300. The user space 350 and the kernel space 340 of the communication device 300 are in FIG. 3 illustrated in the context of being provided in a BPF (or eBPF) environment. However, the herein disclosed embodiments are also implementable in other types of environments. In general terms, the role of the BPF (or eBPF) environment is to allow applications running in the user space 350 to execute custom bytecode safely within the kernel space 340, without requiring any additions or modifications to the source code of the kernel space 340. BPF programs introduce custom code that relates to protected hardware resources, with limited threat to the kernel space 340. A BPF program module 353*a* implements a user-space application to encode the BPF program in bytecode format and to submit it to the kernel space 340. This usually involves using one or more BPF libraries. The BPF program is in the kernel space 340 received by a BPF instructions module 346. Prior to being loaded into a BPF virtual machine 348 for execution, the BPF program is verified. The BPF program is verified by a BPF verifier module 347 that carry out a set of checks of the BPF program. The BPF verifier module 347 is configured to go over the potential paths the BPF program might take when being executed to ensure that the BPF program runs to completion without any looping, which would result in a kernel lockup. The BPF verifier module 347 might further be configured to perform additional checks, such as program size, valid register state checks, and out-of-bound jumps. Upon successful verification (e.g., all checks are cleared), the BPF program is loaded (and compiled, if needed) into the BPF virtual machine 348 for execution in an execution module 348*a*. In this respect, the BPF program runs directly on the processor of the communication devoice 300 just like any other native kernel code. Then, the BPF program waits for the appropriate kernel signal to be executed. When the signal is received in the form of an event (as provided from an events module 380), the BPF program is initiated. In general terms, BPF programs run according to events that trigger them. The events are predefined and might include actions such as network events, system calls, function entry and exit, and kernel trace points. During execution, the bytecode collects and executes 275 information according to its instructions and send its output back to a BPF output module 353*b* in the user space 350. The BPF program module 353*a* and the BPF output module 353*b* are provided in a BPF tool module 353. A BPF program should be able to store its state and share collected data. A BPF map module 348*b* is configured to assist the BPF program to retrieve and store information according to a range of data structures. Map types used by the BPF map module 348*b* might include hash tables or arrays, ring buffer, stack trace, and more. A BPF program might not arbitrarily call into a kernel function. This is because BPF programs need to maintain compatibility and avoid being bound to specific versions of the kernel space 340. A BPF helpers module 370 may provide helper functions to make function calls. Such functional calls allow the BPF program to generate random numbers, receive current time and date, access BPF maps, manipulate forwarding logic and network packets, and more.

Figure 4:
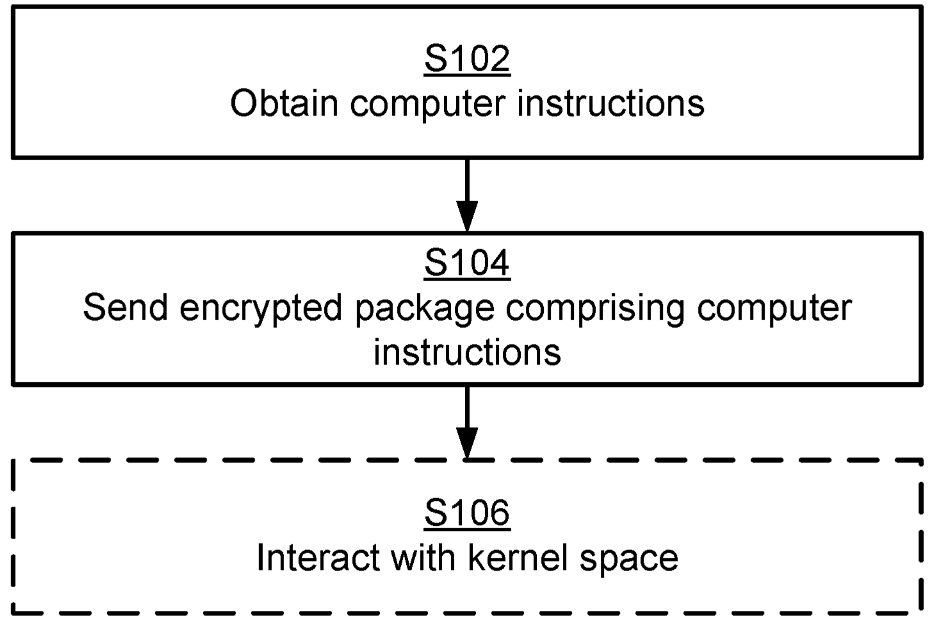
FIGS. 4 and 5 are flowcharts of methods according to embodiments.

Reference is now made to FIG. 4 illustrating a method for remote execution of computer instructions in the kernel space 340 of the communication device 300 as performed by the application server 200 for the communication device 300 according to an embodiment.

S102: The application server 200 obtains computer instructions for handling interaction between the application server 200 and the kernel space 340 of the communication device 300. The computer instructions are to be remotely executed in the kernel space 340 of the communication device 300.

S104: The application server 200 sends an encrypted package towards the kernel space 340 of the communication device 300. The encrypted package comprises the computer instructions.

Embodiments relating to further details of remote execution of computer instructions in the kernel space 340 of the communication device 300 as performed by the application server 200 will now be disclosed.

In some aspects, the package may be, alternatively or in addition to being encrypted, digitally signed before sent by the application server 200. This enables the signature to be verified in the kernel space 340 of the communication device 300. This protects the integrity of the computer instructions in the package. As will be further disclosed below, the package is decrypted (and verified) in the kernel space 340 of the communication device 300. Only the kernel space 340 is enabled to decrypt the package since either the kernel space 340 itself stores decryption keys needed to decrypt the encrypted package or the decryption keys are stored in a secure enclave in hardware only accessible by the kernel space 340. The secure enclave is then assumed to be preconfigured with the decryption keys and certificates (where the certificates are used for digitally signing the packages) during bootstrapping or by means of factory settings, which only the application server 200 is aware of and has access to. This prevents the user space 350 from decrypting or otherwise interfere in any exchange of packages between the application server 200 and the kernel space 340. The same applies also for encryption keys (and certificates) used in the kernel space 340 to encrypt (and digitally sign) packages to be sent to the application server 200.

There may be different ways for the encrypted package to be sent towards the kernel space 340 of the communication device 300. Different embodiments relating thereto will now be described in turn.

In some aspects, the application server 200 directly communicates with the kernel space 340 of the communication device 300 and to remotely execute the computer instructions. Hence, in some embodiments, the encrypted package is sent to an interface of the kernel space 340. The interface interfaces an outside of the communication device 300. In this way the encrypted package never passes the user space 350 on its way to the kernel space 340. This avoids risking the computer instructions to be exposed in the user space 350.

In other aspects, the application server 200 communicates with the kernel space 340 via the user space 350 of the communication device 300. Hence, in some embodiments, the encrypted package is sent to the user space 350 of the communication device 300. The encrypted package is then forwarded from the user space 350 to the kernel space 340 without first being decrypted. This enables existing interfaces of the communication device 300 to be used. That the encrypted package is not decrypted in the user space 350 provides some confidentiality of the execution and avoids a user of the communication device 300 to tamper with the computer instructions, as the user space 350 does not have access to any credentials, such as decryption keys, needed to decrypt the encrypted package.

There could be different ways in which the computer instructions are provided. In this respect, in the encrypted package, the computer instructions are provided either as source code or as compiled bytecode. Further aspects of this will be disclosed with reference to the communication device 300.

There could be different packages in which the computer instructions are provided. In some embodiments, the encrypted package is an encrypted BPF package or an encrypted eBPF package. In this way, the computer instructions can be transmitted towards the kernel space 340 as a set of encrypted BPF programs or encrypted eBPF programs.

Executing the computer instructions in the kernel space 340 (in accordance with the computer instructions sent from the application server 200) generally causes the communication device 300 to interact with the application server 200. Therefore, in some embodiments, the application server 200 is configured to perform (optional) step S106.

S106: The application server 200 interacts with the kernel space 340 in accordance with the computer instructions.

There might be different ways for the application server 200 to interact with the kernel space 340, depending on which computer instructions are sent towards the kernel space 340 of the communication device 300 in S104.

The interaction between the application server 200 and the kernel space 340 could be based on RESTful (where REST is short for representational state transfer), or constrained RESTful, supported application programming interfaces (APIs) such as Hypertext Transfer Protocol Secure (HTTPS), Constrained Application Protocol (CoAP) messages, or Remote Procedure Calls (RPCs) such as Google Remote Procedure Calls (gRPCs), or a message bus such as MQTT, the Advanced Message Queuing Protocol (AMQP) or Kafka.

In some embodiments, according to the computer instructions, the interaction involves the application server 200 to monitor the status of the communication device 300. In this respect, in order for the application server 200 to monitor the status of the communication device 300, data needs to be exchanged between the kernel space 340 and the application server 200. For example, according to the computer instructions, the kernel space 340 is to send the monitored data to the application server 200. The application server 200 might then acknowledge reception of the monitored data. In some non-limiting examples, the status of the communication device 300 that is monitored pertains to any of: status of hardware of the communication device 300 accessible by the kernel space 340, memory usage of the communication device 300, or computer processing usage of the communication device 300.

In some embodiments, according to the computer instructions, the interaction involves the application server 200 to exchange application data with the communication device 300. The application data here pertains to data relating to the application itself. In some non-limiting examples, the application data exchanged with the communication device 300 pertains to any of: data relating to an application run by the communication device 300, change of which application is run in the communication device 300, change of an application run in the communication device 300. In some non-limiting examples, the data relating to an application run in the communication device 300 pertains to any of: accumulated computer processing usage for the application, frequency of occurrence of running the application in the communication device 300, memory bandwidth for read and/or write operations performed when running the application in the communication device 300, or access to library calls made by the application when running the application in the communication device 300.

Figure 5:
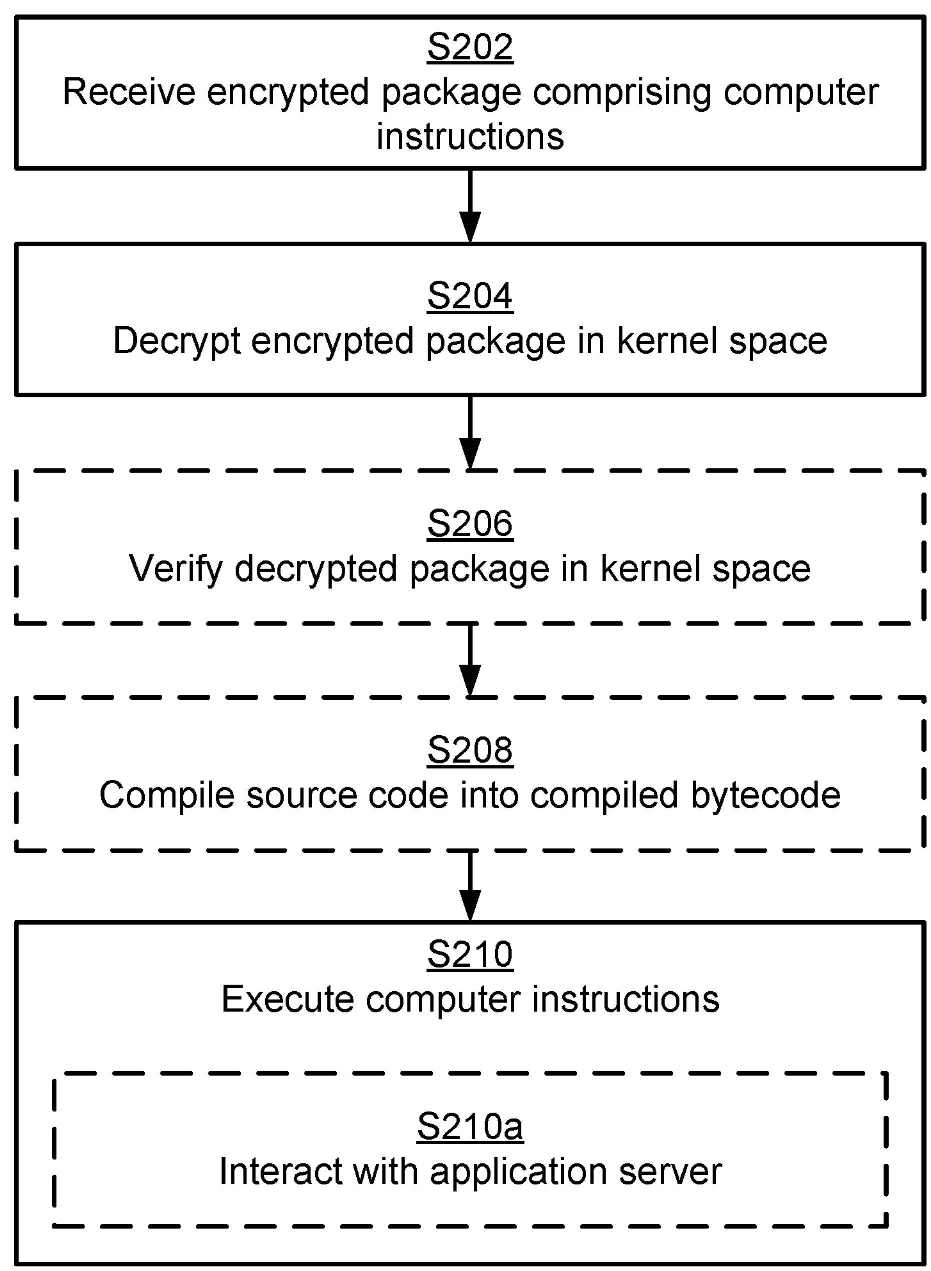

Reference is now made to FIG. 5 illustrating a method for execution of computer instructions in the kernel space 340 of the communication device 300 as performed by the communication device 300 according to an embodiment.

S202: The communication device 300 receives an encrypted package from the application server 200. The encrypted package comprises computer instructions for handling interactions between the application server 200 and the kernel space 340 of the communication device 300.

S204: The communication device 300, in the kernel space 340, decrypts the encrypted package. The decryption of the encrypted package results in a decrypted package.

S210: The communication device 300, in the kernel space 340, executes the computer instructions in the decrypted package.

Embodiments relating to further details of execution of computer instructions in the kernel space 340 of the communication device 300 as performed by the communication device 300 will now be disclosed.

As disclosed above, there may be different ways for the encrypted package to be sent towards the kernel space 340 of the communication device 300. Different embodiments relating thereto will now be described in turn.

As further disclosed above, in some aspects, the application server 200 directly communicates with the kernel space 340 of the communication device 300 and to remotely execute the computer instructions. Hence, in some embodiments, the encrypted package is received from the application server 200 in an interface of the kernel space 340. The interface is interfacing an outside of the communication device 300. One example of such an interface is the sender/receiver module in FIG. 2.

As further disclosed above, in other aspects, the application server 200 communicates with the kernel space 340 via the user space 350 of the communication device 300. Hence, in some embodiments, the encrypted package is received from the application server 200 in a user space 350 of the communication device 300 and forwarded from the user space 350 to the kernel space 340. In one example the encrypted package is received in the LwM2M client module in FIG. 2.

As disclosed above, in some aspects, the package is not only encrypted but also digitally signed before sent by the application server 200. This enables the signature to be verified in the kernel space 340 of the communication device 300, thus verifying that the package originates from the application server 200. Therefore, in some embodiments, the communication device 300 is configured to perform (optional) step S206.

S206: The communication device 300, in the kernel space 340, verifies the decrypted package before executing the computer instructions.

In this respect, in some alternatives, the verification is performed before the decryption and is not related to verification of any digital signature. For example, the encrypted package might be verified by in the kernel space 340 calculating a hash sum, or similar, for the encrypted package to verify that the complete encrypted package has been received and that it has not been tampered with before reaching the kernel space 340.

Further in this respect, in addition to verifying the package as such, also the computer instructions themselves might be verified in the kernel space 340. This, however, requires the computer instructions to be provided as compiled bytecode. For example, a set of checks of the computer instructions might be performed by a verifier, such as the BPF verifier module in FIG. 3.

As disclosed above, in the encrypted package, the computer instructions are provided either as source code or as compiled bytecode. In this respect, the compiled bytecode is directly executable in the kernel space 340 without requiring any compilation. This might thus simplify the implementation of the kernel space 340, and/or lower storage and/or processing requirements of the kernel space 340. When, in the encrypted package, the computer instructions are provided as source code, the computer instructions need to be complied before being executed. Therefore, in some embodiments, the communication device 300 is configured to perform (optional) step S208.

S208: The communication device 300, in the kernel space 340, compiles the source code into compiled bytecode before executing the computer instructions.

That is, if the computer instructions are specified using source code (such as bpftrace instructions, computer instructions in the C programming language, or the C++ programming language, etc.), the communication device 300 needs to compile the computer instructions. In this case, the compilation toolchain installed in the communication device 300 is accessed by the kernel space 340. Compilation of the source code is performed without the user space 350 accessing the source code.

As disclosed above, in some embodiments, according to the computer instructions, the interaction involves the application server 200 to monitor status of the communication device 300. Non-limiting examples of the status of the communication device 300 that is monitored have been disclosed above and apply here as well.

As disclosed above, in some embodiments, according to the computer instructions, the interaction involves the application server 200 to exchange application data with the communication device 300. Non-limiting examples of the application data exchanged with the communication device 300 have been disclosed above and apply here as well. Non-limiting examples of the data relating to an application run in the communication device 300 have been disclosed above and apply here as well.

As disclosed above, executing the computer instructions in the kernel space 340 generally causes the communication device 300 to interact with the application server 200. That is, in some embodiments, the communication device 300 is configured to perform (optional) step S210*a* as part of step S210.

S210*a*: The communication device 300 interacts with the application server 200 in accordance with the computer instructions.

As disclosed above, the interaction between the kernel space 340 and the application server 200 could be based on RESTful, or constrained RESTful, supported APIs such as HTTPS, CoAP messages, or RPCs such as gRPCs, or a message bus such as MQTT, AMQP or Kafka.

As further disclosed above, in some aspects, the interaction with the application server 200 involves data to be transmitted from the kernel space 340 to the application server 200. Two alternatives of how the data might be transmitted from the kernel space 340 to the application server 200 will be disclosed next.

In general terms, during execution of computer instructions, the kernel space 340 interacts with the application server 200 either via the user space 350 or via the kernel space 340 without using the user space 350.

According to a first alternative, any data gathered by the kernel space 340 in accordance with the computer instructions are provided in a package that is encrypted in the kernel space 340, where the thus encrypted package is sent to the user space 350 of the communication device 300. Then, the encrypted package is sent from the user space 350 to the application server 200. Since the data is encrypted, the user cannot read out the content of the encrypted package from the user space 350. In this alternative, the user space 350 thus acts as a bridge, relaying data between the kernel space 340 and the application server 200. One of the issues with this alternative is related to security. A malicious user could manipulate the user space 350 so to avoid sending some of the encrypted packages to the application server 200. Even though this is possible, the application server 200 could realize that packages expected to be received from the kernel space 340 are missing since the malicious user cannot decrypt the content of the encrypted packages and, therefore, does not have knowledge of the content.

The second alternative prevents the security breach of the first alternative. In the second alternative, the encrypted package is sent directly from the kernel space 340 to the application server 200, avoiding the possibility of any manipulation in the user space 350 of the communication device 300.

As disclosed above, there could be different packages in which the computer instructions are provided. In some embodiments, the encrypted package is an encrypted BPF package or an encrypted eBPF package. In this way, the computer instructions can be processed in the kernel space 340 as a set of encrypted BPF programs or encrypted eBPF programs. This further enables the computer instructions to be executed in a BPF virtual machine or an eBPF virtual machine run in the kernel space 340.

Figure 6:
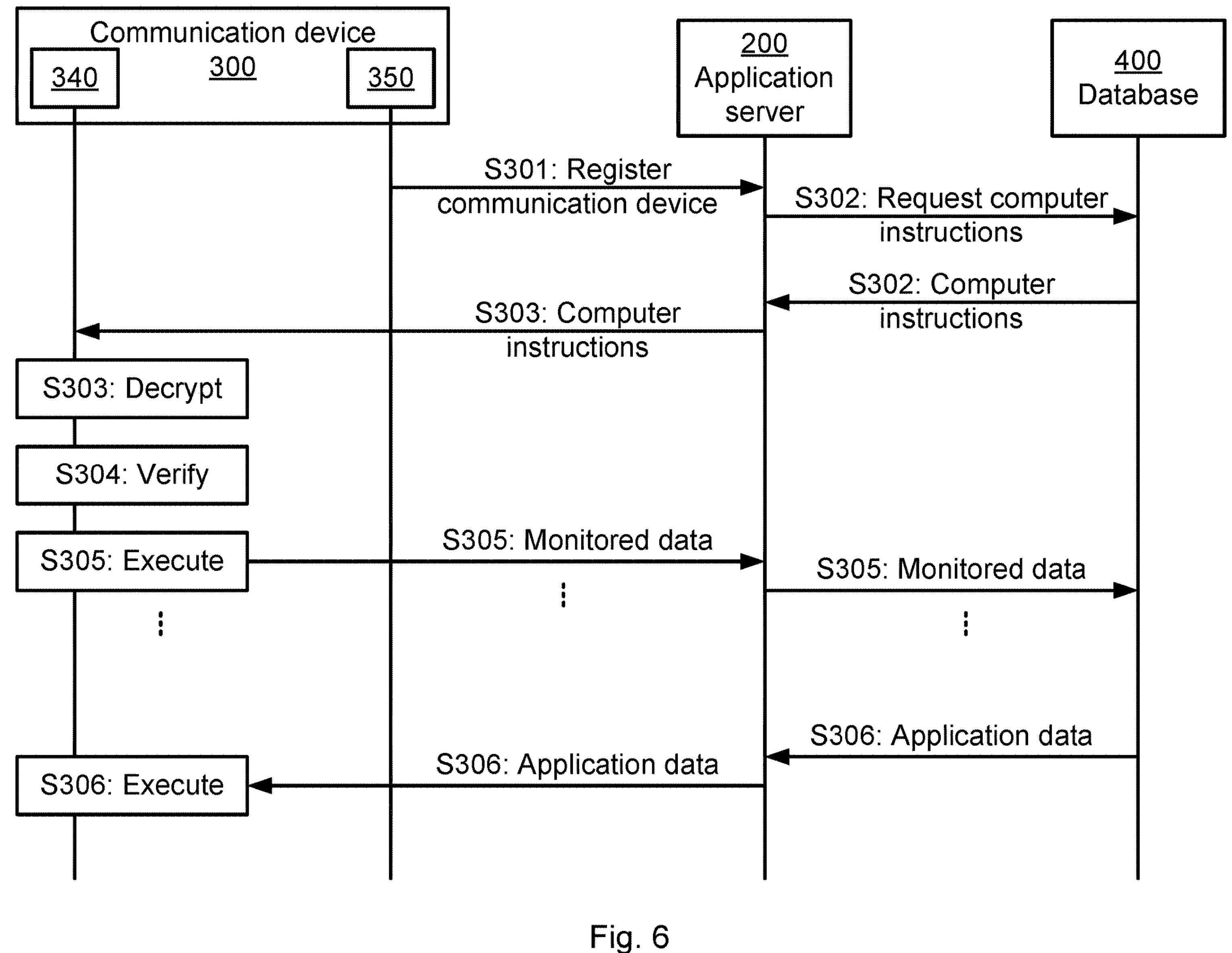
FIG. 6 is a signalling diagram according to an embodiment.

One particular embodiment for remote execution of computer instructions in the kernel space 340 of the communication device 300 based on at least some of the above disclosed embodiments will now be disclosed in detail with reference to the signalling diagram of FIG. 6.

S301: The communication device 300 is registered with the IoT service provider network 500 via the application server 200. Secure communication is established between the application server 200 and the communication device 300.

S302: The application server 200 requests from, and receives from, the IoT application database 400 computer instructions for handling interaction between the application server 200 and the kernel space 340 of the communication device 300.

The computer instructions define the code to be executed in the kernel space 340 of the communication device 300 to gather and share information of the communication device 300 with the IoT service provider network 500, as represented by the application server 200. In some examples the computer instructions are provided in a verifiable and encrypted eBPF package. Further, the application server 200 forwards the computer instructions to the communication device 300.

S303, S304: The computer instructions are provided to the kernel space 340 of the communication device 300. In the kernel space 340 the computer instructions are decrypted (S303) and verified (S304), and possible also compiled, before being executed. In this respect, the computer instructions only need to be compiled in case the computer instructions are stored uncompiled in the IoT application database 400 and are not compiled in the application server 200 before being provided to the kernel space 340.

S305: The communication device 300, in the kernel space 340, executes the computer instructions and interacts with the application server 200 in accordance with the computer instructions. For illustrative purposes, the interaction in S305 involves the kernel space 340 to, at one or more occasions, send monitored data to the application server 200, thus enabling the application server 200 to monitor status of the communication device 300. The application server 200 might acknowledge safe receipt of each piece of monitored data received (not shown in FIG. 6).

S306: The communication device 300, in the kernel space 340, continues to execute the computer instructions and thus further interacts with the application server 200 in accordance with the computer instructions. For illustrative purposes, the interaction in S306 involves the application server 200 to exchange application data with the communication device 300. As disclosed above, exchanging application data might involve change of which application is run in the communication device 300, and/or change of an application run in the communication device 300. This might cause steps S302, S303, and S304 to be repeatedly performed (not shown in FIG. 6) to upload a new set of computer instructions to the in the kernel space 340 of the communication device 300.

Figure 7:
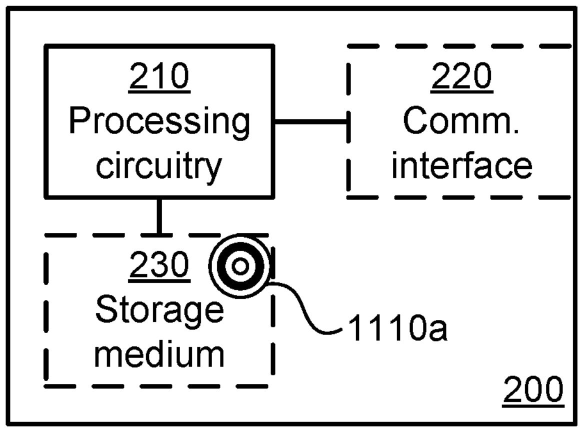
FIG. 7 is a schematic diagram showing functional units of an application server according to an embodiment.

FIG. 7 schematically illustrates, in terms of a number of functional units, the components of an application server 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110*a* (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the application server 200 to perform a set of operations, or steps, as disclosed above. For example, the storage medium 230 may store the set of operations, and the processing circuitry 210 may be configured to retrieve the set of operations from the storage medium 230 to cause the application server 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The application server 200 may further comprise a communications interface 220 for communications with other functions, nodes, entities, and devices, as in the communication system 100 of FIG. 1. As such the communications interface 220 may comprise one or more transmitters and receivers, comprising analogue and digital components.

The processing circuitry 210 controls the general operation of the application server 200 e.g. by sending data and control signals to the communications interface 220 and the storage medium 230, by receiving data and reports from the communications interface 220, and by retrieving data and instructions from the storage medium 230. Other components, as well as the related functionality, of the application server 200 are omitted in order not to obscure the concepts presented herein.

Figure 8:
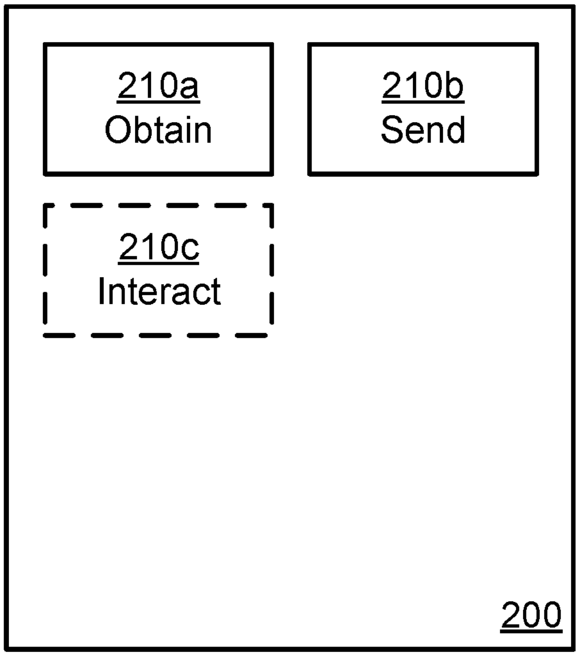
FIG. 8 is a schematic diagram showing functional modules of an application server according to an embodiment.

FIG. 8 schematically illustrates, in terms of a number of functional modules, the components of an application server 200 according to an embodiment. The application server 200 of FIG. 8 comprises an obtain module 210*a* configured to perform step S102, and a send module 210*b* configured to perform step S104. The application server 200 of FIG. 8 may further comprise a number of optional functional modules, such as an interact module 210*c* configured to perform step S106. In general terms, each functional module 210*a*: 210*c* may be implemented in hardware or in software. Preferably, one or more or all functional modules 210*a*: 210*c* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*: 210*c* and to execute these instructions, thereby performing any steps of the application server 200 as disclosed herein.

The application server 200 may be provided as a standalone device or as a part of at least one further device. Alternatively, functionality of the application server 200 may be distributed between at least two devices, or nodes. These at least two nodes, or devices, may either be part of the same network part of the IoT service provider network 500 or may be spread between at least two such network parts. In general terms, instructions that are required to be performed in real time may be performed in a device, or node, operatively closer to the edge of the IoT service provider network 500 than instructions that are not required to be performed in real time. Thus, a first portion of the instructions performed by the application server 200 may be executed in a first device, and a second portion of the instructions performed by the application server 200 may be executed in a second device; the herein disclosed embodiments are not limited to any particular number of devices on which the instructions performed by the application server 200 may be executed. Hence, the methods according to the herein disclosed embodiments are suitable to be performed by an application server 200 residing in a cloud computational environment. Therefore, although a single processing circuitry 210 is illustrated in FIG. 7 the processing circuitry 210 may be distributed among a plurality of devices, or nodes. The same applies to the functional modules 210*a*: 210*c* of FIG. 8 and the computer program 1120*a* of FIG. 11.

Figure 9:
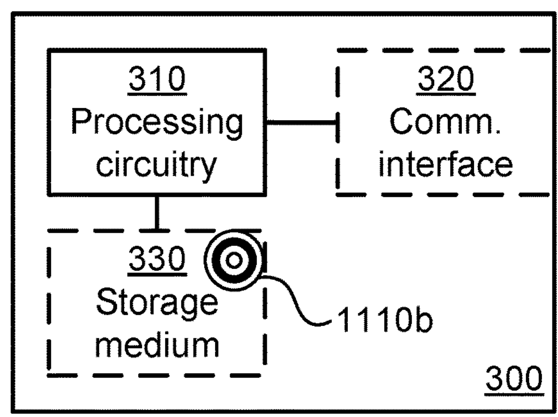
FIG. 9 is a schematic diagram showing functional units of a communication device according to an embodiment.

FIG. 9 schematically illustrates, in terms of a number of functional units, the components of a communication device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110*b* (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the communication device 300 to perform a set of operations, or steps, as disclosed above. For example, the storage medium 330 may store the set of operations, and the processing circuitry 310 may be configured to retrieve the set of operations from the storage medium 330 to cause the communication device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The communication device 300 may further comprise a communications interface 320 for communications with other functions, nodes, entities, and devices, as in the communication system 100 of FIG. 1. As such the communications interface 320 may comprise one or more transmitters and receivers, comprising analogue and digital components.

The processing circuitry 310 controls the general operation of the communication device 300 e.g. by sending data and control signals to the communications interface 320 and the storage medium 330, by receiving data and reports from the communications interface 320, and by retrieving data and instructions from the storage medium 330. Other components, as well as the related functionality, of the communication device 300 are omitted in order not to obscure the concepts presented herein.

Figure 10:
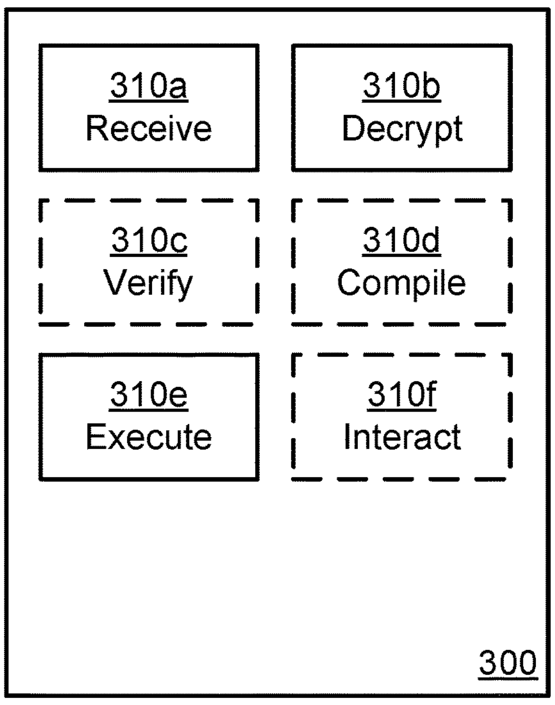
FIG. 10 is a schematic diagram showing functional modules of a communication device according to an embodiment.

FIG. 10 schematically illustrates, in terms of a number of functional modules, the components of a communication device 300 according to an embodiment. The communication device 300 of FIG. 10 comprises a number of functional modules; a receive module 310*a* configured to perform step S202, a decrypt module 310*b* configured to perform step S204, and an execute module 310*e* configured to perform step S210. The communication device 300 of FIG. 10 may further comprise a number of optional functional modules, such as any of a verify module 310*c* configured to perform step S206, a compile module 310*d* configured to perform step S208, and an interact module 310*f* configured to perform step S210*a*. In general terms, each functional module 310*a*:310*f* may be implemented in hardware or in software. Preferably, one or more or all functional modules 310*a*:310*f* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*:310*f* and to execute these instructions, thereby performing any steps of the communication device 300 as disclosed herein.

Figure 11:
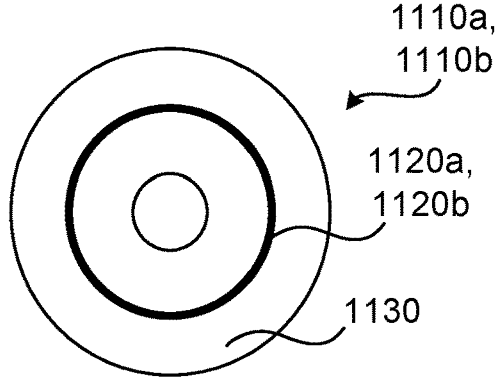
FIG. 11 shows one example of a computer program product comprising computer readable means according to an embodiment.

FIG. 11 shows one example of a computer program product 1110*a*, 1110*b* comprising computer readable means 1130. On this computer readable means 1130, a computer program 1120*a* can be stored, which computer program 1120*a* can cause the processing circuitry 210 and thereto operatively coupled entities and devices, such as the communications interface 220 and the storage medium 230, to execute methods according to embodiments described herein. The computer program 1120*a* and/or computer program product 1110*a* may thus provide means for performing any steps of the application server 200 as herein disclosed. On this computer readable means 1130, a computer program 1120*b* can be stored, which computer program 1120*b* can cause the processing circuitry 310 and thereto operatively coupled entities and devices, such as the communications interface 320 and the storage medium 330, to execute methods according to embodiments described herein. The computer program 1120*b* and/or computer program product 1110*b* may thus provide means for performing any steps of the communication device 300 as herein disclosed.

In the example of FIG. 11, the computer program product 1110*a*, 1110*b* is illustrated as an optical disc, such as a CD (compact disc) or a DVD (digital versatile disc) or a Blu-Ray disc. The computer program product 1110*a*, 1110*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120*a*, 1120*b* is here schematically shown as a track on the depicted optical disk, the computer program 1120*a*, 1120*b* can be stored in any way which is suitable for the computer program product 1110*a*, 1110*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for remote execution of computer instructions in a kernel space of a communication device, the method being performed by an application server for the communication device, the method comprising:

obtaining computer instructions for handling interaction between the application server and the kernel space, wherein the computer instructions are to be remotely executed in the kernel space of the communication device; and sending an encrypted package comprising the computer instructions towards the kernel space of the communication device, wherein, in the encrypted package, the computer instructions are provided as source code.

2. The method according to claim 1, wherein the encrypted package is sent to:

an interface of the kernel space, the interface interfacing an outside of the communication device; or a user space of the communication device.

3. The method according to claim 1, wherein, according to the computer instructions, the interaction involves the application server monitoring a status of the communication device and/or the application server exchanging application data with the communication device.

4. The method according to claim 3, wherein:

the status of the communication device that is monitored pertains to any of: a status of hardware of the communication device accessible by the kernel space, memory usage of the communication device, or processing usage of the communication device; and/or the application data exchanged with the communication device pertains to any of: data relating to an application run by the communication device, a change of which application is run in the communication device, or change of an application run in the communication device.

5. The method according to claim 4, the application data exchanged with the communication device pertains to data relating to an application run by the communication device, wherein the data relating to an application run in the communication device pertains to any of: accumulated processing usage for the application, frequency of occurrence of running the application in the communication device, memory bandwidth for read and/or write operations performed when running the application in the communication device, or access to library calls made by the application when running the application in the communication device.

6. The method according to claim 1, wherein the method further comprises:

interacting with the kernel space in accordance with the computer instructions.

7. The method according to claim 1, wherein the encrypted package is an encrypted Berkeley Packet Filter (BPF) package or an encrypted extended BPF (eBPF) package.

8. A method for execution of computer instructions in a kernel space of a communication device, the method being performed by the communication device, the method comprising:

receiving, from an application server for the communication device, an encrypted package comprising computer instructions for handling interaction between the application server and the kernel space;

in the kernel space, decrypting the encrypted package, resulting in a decrypted package; and in the kernel space, executing the computer instructions in the decrypted package, wherein, in the encrypted package, the computer instructions are provided as source code, and wherein the method further comprises:

in the kernel space, compiling the source code into compiled bytecode before executing the computer instructions.

9. The method according to claim 8, wherein the encrypted package is received:

from the application server in an interface of the kernel space, the interface interfacing an outside of the communication device; or from the application server in a user space of the communication device and forwarded from the user space to the kernel space.

10. The method according to claim 8, wherein the method further comprises:

in the kernel space, verifying the decrypted package before executing the computer instructions.

11. The method according to claim 8, wherein, according to the computer instructions, the interaction involves the application server to monitor status of the communication device and/or the application server to exchange application data with the communication device.

12. The method according to claim 11, wherein:

the status of the communication device that is monitored pertains to any of: a status of hardware of the communication device accessible by the kernel space, memory usage of the communication device, or processing usage of the communication device; and/or the application data exchanged with the communication device pertains to any of: data relating to an application run by the communication device, a change of which application is run in the communication device, or a change of an application run in the communication device.

13. The method according to claim 12, wherein the data relating to an application run in the communication device pertains to any of: accumulated processing usage for the application, frequency of occurrence of running the application in the communication device, memory bandwidth for read and/or write operations performed when running the application in the communication device, or access to library calls made by the application when running the application in the communication device.

14. The method according to claim 8, wherein executing the computer instructions comprises:

interacting with the application server in accordance with the computer instructions.

15. The method according to claim 8, wherein the encrypted package is an encrypted Berkeley Packet Filter (BPF) package or an encrypted extended BPF (eBPF) package.

16. The method according to claim 15, wherein the computer instructions are executed in a BPF virtual machine or an eBPF virtual machine run in the kernel space.

17. An application server for remote execution of computer instructions in a kernel space of a communication device, the application server comprising processing circuitry, the processing circuitry being configured to cause the application server to:

obtain computer instructions for handling interaction between the application server and the kernel space, wherein the computer instructions are to be remotely executed in the kernel space of the communication device; and send an encrypted package comprising the computer instructions towards the kernel space of the communication device, wherein, in the encrypted package, the computer instructions are provided as source code.

18. A communication device for execution of computer instructions in a kernel space of the communication device, the communication device comprising processing circuitry, the processing circuitry being configured to cause the communication device to:

receive, from an application server for the communication device, an encrypted package comprising computer instructions for handling interaction between the application server and the kernel space;

in the kernel space, decrypt the encrypted package, resulting in a decrypted package; and in the kernel space, execute the computer instructions in the decrypted package, wherein, in the encrypted package, the computer instructions are provided as source code, and wherein the processing circuitry is further configured to cause the communication device to:

in the kernel space, compile the source code into compiled bytecode before executing the computer instructions.

* * * * *